Figure 1:
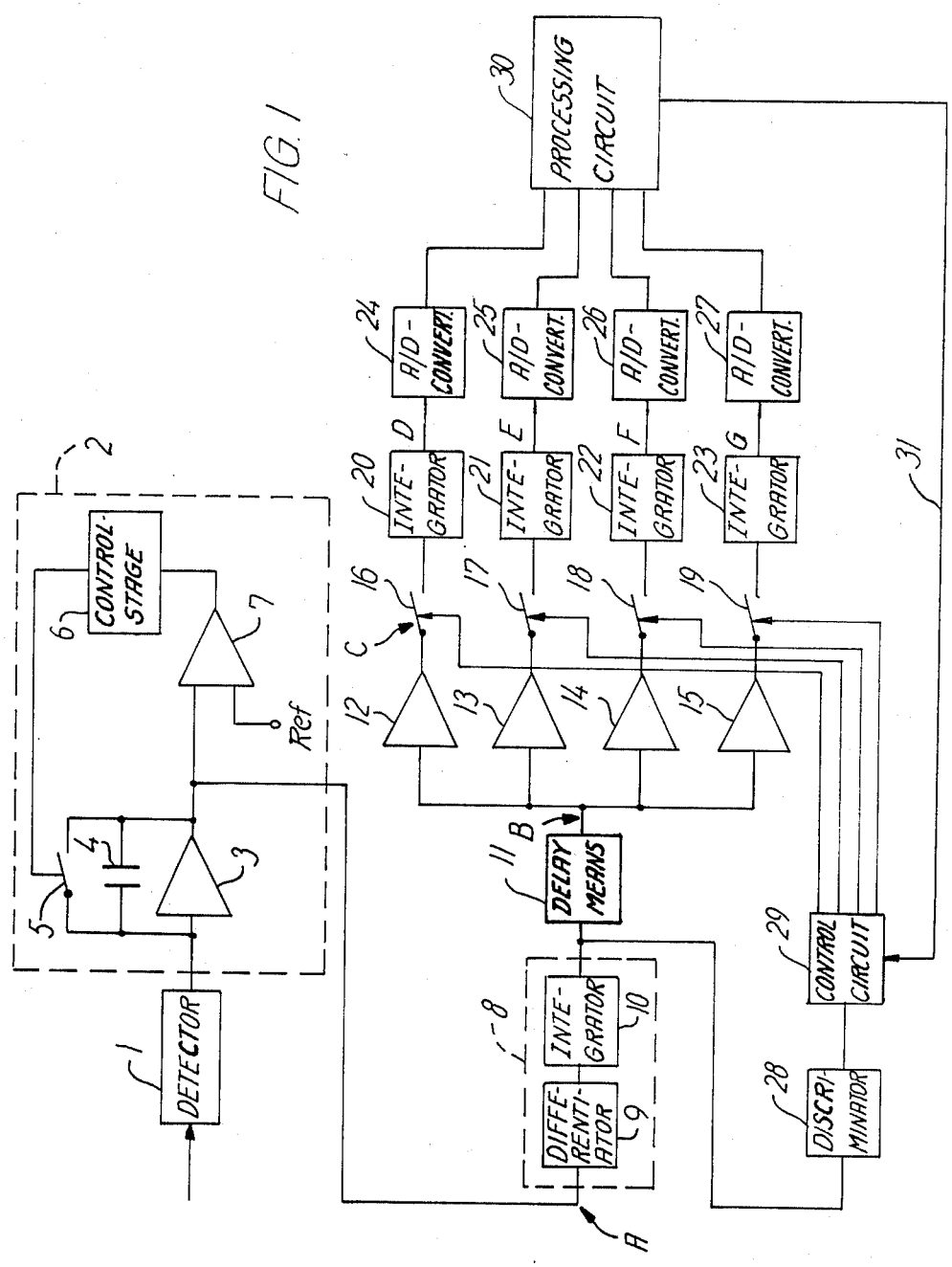

United States Patent [19]

Nielsen

[11] Patent Number: 4,767,997
[45] Date of Patent: Aug. 30, 1988

[54] CIRCUIT ARRANGEMENT FOR PROCESSING SIGNALS FROM A NUCLEAR DETECTOR

[75] Inventor: Henrik K. Nielsen, Copenhagen N, Denmark

[73] Assignee: Forsogsanlaeg Riso, Denmark

[21] Appl. No.: 875,163

[22] Filed: Jun. 17, 1986

[30] Foreign Application Priority Data

Jun. 19, 1985 [DK] Denmark .............................. 2784/85

[51] Int. Cl.$^4$ ......................... H03K 5/01; H03K 5/15
[52] U.S. Cl. ..................................... 328/108; 307/353; 328/105; 328/116; 328/151
[58] Field of Search ........ 328/108, 109, 105, 114–117, 328/151; 307/353

[56] References Cited

U.S. PATENT DOCUMENTS 3,125,721 3/1964 Schumann ............................ 328/116
3,525,047 8/1970 Schwartz ............................. 328/114

FOREIGN PATENT DOCUMENTS 1153822 5/1969 United Kingdom .
1377931 12/1974 United Kingdom .

OTHER PUBLICATIONS

*Pulse and Digital Circuits,* Millman and Taub, McGraw-Hill Book Company, Inc., 1956, pp. 305, 343, 344, 397–400, 403–404.

Primary Examiner—John Zazworsky
Attorney, Agent, or Firm—Beveridge, DeGrandi & Weilacher

[57] ABSTRACT

A circuit arrangement for processing signals occurring at randomly varying intervals wherein the processing time is not negligible. A portion of the signal path is divided into a plurality of identical parallel part-signal-paths, each having an electronic switch (16–19) controlled by a control circuit (29) in such a way that the electronic switch in a free part-signal-path is made conducting when a signal occurs during the processing time of the preceding signal. Correct processing of a greater number of signals is thus achieved than has been possible with known circuit arrangements.

2 Claims, 2 Drawing Sheets

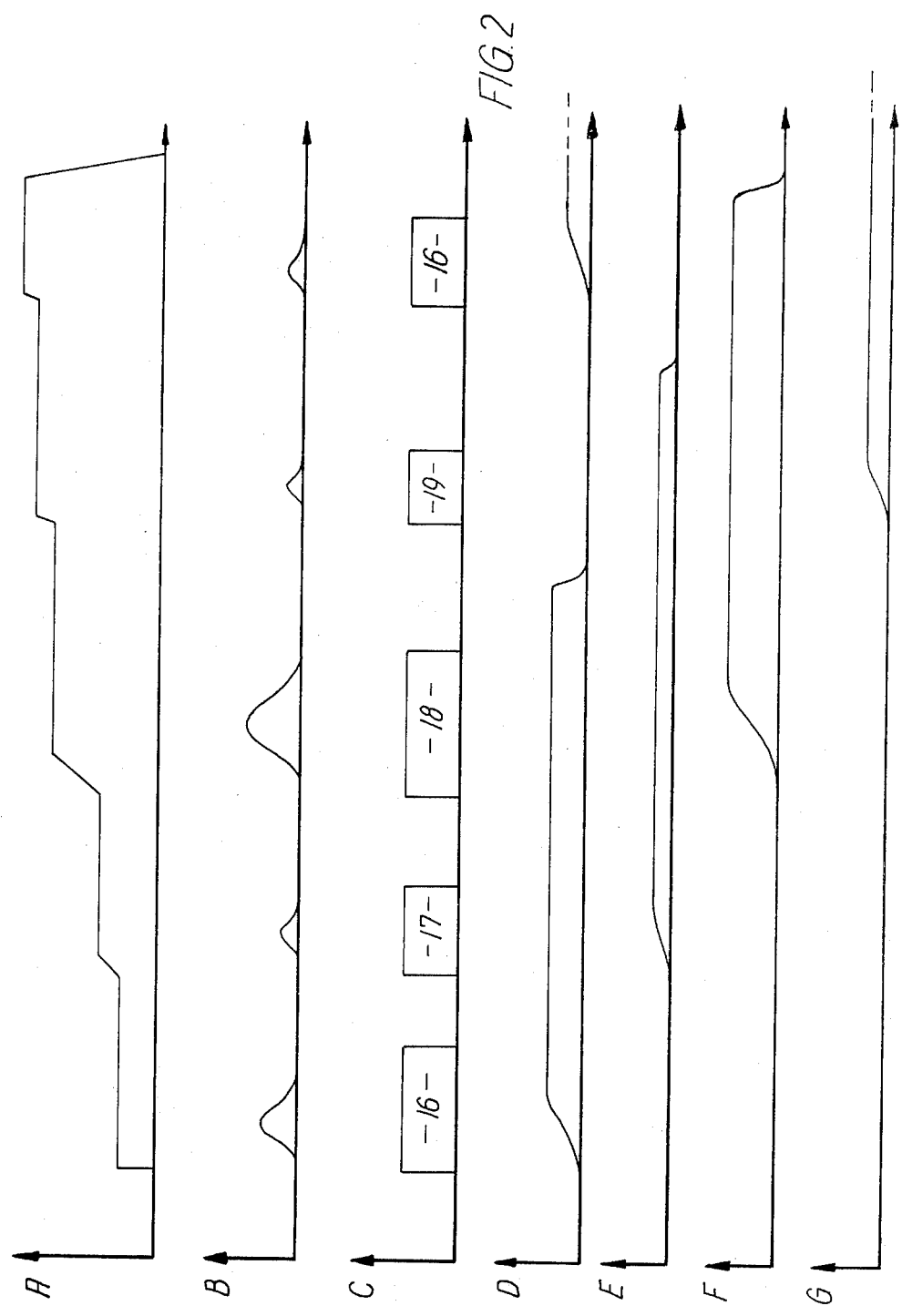

CIRCUIT ARRANGEMENT FOR PROCESSING SIGNALS FROM A NUCLEAR DETECTOR

The invention relates to a circuit arrangement for processing pulse-shaped signals, originating from a nuclear detector and occurring at randomly varying time intervals and to the processing of which a not negligible period is required, said circuit arrangement comprising a signal path including a pulse-shaping circuit, a delay means and a signal-processing circuit, the signal path being divided over part of its extension into parallel part-signal-paths, each including an electronic switch and signal-modifying circuits, a discriminator to detect a signal in the signal path and a control circuit to control the conduction of the electronic switches and controlled by the discriminator being connected to the signal path ahead of the delay means.

A circuit arrangement of this type is known from U.S. Pat. No. 3,747,001. This known circuit arrangement comprises two part-signal-paths, a slow and a fast one, of which the fast one provides inferior resolution compared with the slow one. If by means of the discriminator it is detected that two pulses follow each other with a short time interval therebetween, the signal from the fast channel is supplied by means of the relevant switch to the signal processing circuit which in this case is a pulse height analyzer. Thus, this circuit arrangement provides an inferior result when the pulses follow each other in a fast succession.

From U.S. Pat. No. 3,792,255 a further circuit arrangement is known comprising a single electronic switch which by means of a discriminator is controlled in such a way by the undelayed signal that the switch is activated before the delayed signal reaches the input of the switch. In this known circuit arrangement, which has for its purpose to process pulse-shaped signals produced in a nuclear detector and originating from nuclear decay, it is desirable to measure the radiation energy produced in the detector and proportional to the amplitude af the pulse-shaped signals. However, the slope of the leading edge of these signals varies with the time of collection of the charges, and the leading edges may therefore result in errors in the measuring results. This is avoided by the electronic switch which at the start of each pulse-shaped signal is made non-conducting and which remains non-conducting for a period which includes the leading edge of the signal. If in this known circuit arrangement a further signal occurs during the processing of the previous signal, incorrect measuring results will inevitably be produced.

Another circuit arrangement known from U.S. Pat. No. 3,148,353 comprises an input gate which after a pulse-shaped signal has passed is blocked during the processing time of the passed pulse. If within the processing time further pulses occur, none of these will influence the measuring result, which in this case is not falsified, however pulses arriving during the processing time are lost.

The present invention has for its purpose to provide a circuit arrangement of the type indicated in the opening paragraph, in which the quality of each measuring result—as opposed to the circuit arrangement according to U.S. Pat. No. 3,747,001—does not depend on the speed of succession of the pulses, and where the risk of errors in the measuring results is considerably reduced and the number of passed undisturbed pulses is increased.

To achieve this, the circuit arrangement according to the invention is characterized in that the parallel part-signal-paths are identical, and that the electronic switch in each part-signal-path is inserted ahead of the signal-modifying circuits, and that the control circuit is so designed that when the discriminator detects the presence of a signal in the signal path, the electronic switch in one of the part-signal-paths is made to conduct for a period which is at least as long as the duration of the signal as detected by the discriminator. Because the part-signal-paths are identical, a pulse-shaped signal occurring before the processing time of the preceding signal has terminated can be processed in one of the other part-signal-paths without the measuring result being deteriorated. However, this requires that the electronic switches in the part-signal-paths be inserted ahead or upstream of the signal-modifying circuits and not, as in the circuit arrangement according to U.S. Pat. No. 3,747,001, in the outputs of the part-signal-paths. Furthermore, the risk of the erroneous measuring results occurring in the circuit arrangements known from U.S. Pat. Nos. 3,148,353 and 3,792,255 when signals succeed each other quickly is substantially reduced.

The manner in which the circuit arrangement according to the invention functions may have some resemblance to the functioning of a demultiplexer, but it should be remembered that the signals occurring in a multiplex system on the common transmission path are characterized in some way or other. By frequency multiplex its signal has each own frequency or its own frequency range, and in time multiplexing each signal is characterized by its timely position within a time cycle. This is not the case in the circuit arrangement according to the invention, in which the signals occur at unpredictable times, the occurrence being described by a Poisson-distribution.

The distribution by time-demultiplexing of signals from a common signal path on a plurality of part-signal-paths by means of switches opened cyclically for the signals in predetermined periods within a time cycle therefore cannot be used where the signals occur at randomly varying time intervals.

According to the invention the electronic switches in the part-signal-paths can be made conducting cyclically. This is an easy way of controlling the switches, and the results will be good when the circuit arrangement according to the invention is used for processing pulseshaped signals, the processing time of which is fairly constant and substantially longer than the duration of the pulses.

In the following, the invention will be explained in detail with reference to the diagrammatic drawing, in which FIG. 1 shows a block diagram of a circuit arrangement according to the invention, and FIG. 2 shows various signals appearing in the circuit arrangement shown in FIG. 1.

The input signal to the circuit arrangement shown in FIG. 1 is produced by means of a detector 1 transforming radiation from nuclear decay into electrical signals. Typically, it is the energy of the electromagnetic radiation (gamma radiation) which it is desired to measure. In the crystal of the detector, the electromagnetic radiation is transformed into free charge carriers, and the charge thereof, which is proportional to the radiation energy supplied to the crystal, can be transformed into a current pulse when a voltage is supplied across the crystal. This current pulse is supplied to a preamplifier 2, in which the current pulses are transformed into voltage jumps, the magnitude of which are also proportional to the radiation energy supplied to the crystal.

The preamplifier 2 comprises an amplifier stage 3 with an integration capacitor 4 connected parallel to an electronic switch 5 controlled by a control stage 6 to which the output signal of an amplifier stage 7 is supplied. This amplifier stage functions as a comparator to which the output signal of the amplifier stage 3 as well as a reference voltage REF are supplied. As a result of this, an output signal from the amplifier stage 7 is obtained when the output signal of the amplifier stage 3 reaches the value REF. After a period determined by the processing time of the event that brought the output signal of the amplifier stage 3 to the value REF, the control stage 6 will make the electronic switch 5 conducting, whereby the output signal from the amplifier stage 3 and thereby from the preamplifier 2 becomes 0. Hereby an output signal of the preamplifier 2 is obtained which, for instance, may be as shown at A in FIG. 2.

The output signal of the preamplifier 2 is supplied to a pulse-shaping circuit 8 comprising a differentiator 9 followed by an integrator 10. The output signal of the pulse-shaping circuit 8 is supplied to a delay means 11. The voltage jumps shown in FIG. 2A are hereby transformed into the pulse-shaped signals shown in FIG. 2B. After the delay means 11, the signal path from the preamplifier 2 is divided into four parallel part-signal-paths, each comprising a buffer amplifiers 12–15, a controlled electronic switches 16–19, a voltage integrators 20–23 and an analog-to-digital converter 24–27.

The output signal from the pulse-shaping circuit 8, which apart from the delay corresponds to the signal shown in FIG. 2B, is supplied to a discriminator 28 which detects the presence of a signal on the output of the pulse-shaping circuit, and the output signal of which is supplied to a control circuit 29 controlling the electronic switches 16–19. Since the discriminator can detect only signals of a certain amplitude, the control circuit is adapted to make the electronic switches conducting for periods which are somewhat longer than the duration of the signals detected by the discriminator. The electronic switches 16–19 may therefore be conducting as shown, for instance, in FIG. 2C. The delay means 11 has for its purpose to ensure that the electronic switches have been made conducting before the pulse-shaped signals appear on the inputs of the switches. The result is that each of the pulse-shaped signals shown in FIG. 2B is to its full extent transmitted through one of the electronic switches.

The signals passed through the buffer amplifiers 12–15 and the electronic switches 16–19 are integrated in the voltage integrators 20–23, whereby the signals shown in FIGS. 2D–2G are produced. By using the technique of voltage integration, by which the area of the pulse is used as an expression of the energy supplied to the detector, the influence on the measuring results of the variations in the charge-collecting time in the detector illustrated by the different slopes of the voltage jumps in FIG. 2A is eliminated. The output signals of the voltage integrators are supplied to the analog-to-digital converters 24–27, in which the analog signals are converted into digital signals. The duration of the signals shown in FIGS. 2D–2G are determined in such a way that the analog-to-digital converters have sufficient time to carry out the conversion. Use is preferably made of a fixed period after the time when the relevant electronic switch has been made non-conducting.

The output signals from the converters 24–27 are supplied to a processing circuit 30, in which the further processing of the digital signals derived from the pulse-shaped signals is performed. This further treatment may, for instance, be a evaluating and a succeeding grouping of the supplied signals on the basis of their magnitude followed by a counting of the pulses within each group and storing of the result.

The signal processing time (conversion time) in the analog-to-digital converters, FIGS. 2D–2G, is substantially longer than the duration of the pulse-shaped signals, FIG. 2B. The processing time can, for instance, be of the order of magnitude of 20 $\mu$sec, whereas the duration of the signals may be of the order of magnitude of 2 $\mu$sec.

In known circuit arrangements for processing pulse-shaped signals of the type in question, in which a part of the signal path is not divided into a plurality of parallel part-signal-paths, a pulse-shaped signal can be processed correctly only if it appears after the expiration of the processing time of the preceding pulseshaped signal. If the time interval between the pulse-shaped signals does not at least correspond to the processing time, then in the known circuit arrangements either the latter of two pulse-shaped signals will disturb the processing of a preceding signal, so that the measuring results will be incorrect, or the latter signal will be prevented from reaching the processing circuit, whereby it is completely lost for the measurement.

Thus, as appears from FIGS. 2D–2G by means of the circuit arrangement according to the invention, it is possible to utilize far more of the pulse-shaped signals for producing correct measuring results.

In the case indicated above, where the processing times of the signals are fairly equal and substantially longer than the durations of the signals, an effective functioning of the circuit arrangement is obtained by controlling the electronic switches 16–19 in a cyclic sequence, as indicated in FIG. 2C. If, however, the processing times of the pulse-shaped signals vary substantially, it may happen that a free part-signal-path is not the cyclically succeeding one, and in such a case it may be expedient to construct the processing circuit 30 in such a way that it reports back to the control circuit 29 when a part-signal-path becomes free, and this is indicated in FIG. 1 by the connection 31 shown in dotted lines.

The pulse-shaping circuit 8 need not be arranged at the place of the signal path, as indicated in FIG. 1. It may, for instance, be substituted by a pulse-shaping circuit in each of the part-signal-paths. However, in this case it is required that the preamplifier is of the type indicated in the aforementioned U.S. Pat. No. 3,792,255, in which the ouput voltage is reduced to 0 after each pulse.

The invention is described above by its use on pulse-shaped signals produced by detecting nuclear radiation, but it can also be used on other pulse-shaped signals having a not negligible processing time, and where the pulses can appear within the processing time of the preceding pulse.

The invention is not limited to the circuit arrangement shown on the drawing and described above, but can be varied in a number of ways within the scope of the following patent claims.

I claim:

1. A circuit for processing randomly occurring pulse-shaped signals comprising:

(a) signal delaying means;
(b) signal input means for receiving pulse-shaped signals and applying such received signals to said signal delaying means;
(c) signal processing means;
(d) at least three signal modifying paths coupling said signal delaying means to said signal processing means, each signal modifying path including:
  (i) a signal modifying device for receiving a pulse-shaped signal from said signal delaying means, modifying such signal to produce a digital signal and applying such digital signal to said signal processing means independently of signal modification by the signal modifying devices in the other signal modifying paths; and
  (ii) an electronic switch normally isolating the associated signal modifying device from said signal delaying means and operative to selectively connect the associated signal modifying device to said signal delaying means for receipt of a delayed pulse-shaped signal therefrom, each signal modifying device requiring a time period for modifying a pulse-shaped signal that is greater than the minimum interval between consecutive pulse-shaped signals received by said signal input means;
(e) a signal discriminator connected to said signal input means for detecting a received signal before passage thereof by said signal delaying means and generating a discrimination signal in response to the received signal; and
(f) control means responsive to the discrimination signal for making one of said electronic switches operative for a predetermined period at least as long as the duration of the received signal detected by said discriminator.

2. A circuit as claimed in claim 1, wherein said signal processing means generates a feedback signal when one of said signal modifying means completes modifying of a signal, making the associated signal modifying path available to receive another signal from said delay means, said circuit further comprising feedback means for transmitting the feedback signal to said control means to enable said control means to respond to the next discrimination signal by making the electronic switch in the available path operative for said predetermined time period.

* * * * *